(12) United States Patent
Demant et al.

(10) Patent No.: US 8,930,441 B2
(45) Date of Patent: Jan. 6, 2015

(54) ARCHITECTURE FOR MODELED PATTERN BASED USER INTERFACES

(75) Inventors: Hilmar Demant, Karlsdorf (DE); Frank Schertel, Mannheim (DE); Ioannis Grammatikakis, Maxdorf (DE); Jan Heiler, Walldorf (DE); Sebastian Droll, Heidelberg (DE); Thorsten Weber, Mannheim (DE); Markus Viol, Walldorf (DE); Alexander Rauh, Weinheim (DE); Joachim Fitzer, Schriesheim (DE); Juergen Sattler, Wiesloch (DE)

(73) Assignee: SAP SE, Walldorf (DE)

( * ) Notice: Subject to any disclaimer, the term of this patent is extended or adjusted under 35 U.S.C. 154(b) by 498 days.

(21) Appl. No.: 12/871,372

(22) Filed: Aug. 30, 2010

(65) Prior Publication Data

US 2012/0054262 A1 Mar. 1, 2012

(51) Int. Cl.
*G06F 15/16* (2006.01)
*G06F 3/00* (2006.01)
*G06F 9/54* (2006.01)
*G06F 9/44* (2006.01)

(52) U.S. Cl.
CPC .............. *G06F 9/54* (2013.01); *G06F 9/4443* (2013.01)
USPC ......................................... 709/203; 719/316

(58) Field of Classification Search
USPC ............................ 709/203; 707/944; 719/316
See application file for complete search history.

(56) References Cited

U.S. PATENT DOCUMENTS

2005/0005259 A1* 1/2005 Avery et al. .................... 717/103
2005/0034079 A1* 2/2005 Gunasekar et al. ........... 715/753
2008/0162095 A1* 7/2008 Brunswig et al. ................ 703/6

OTHER PUBLICATIONS

Erik G. Nilsson, Jacqueline Floch, Svein Hallsteinsen and Erlend Stay "Model-based user interface adaptation", Dagstuhl Seminar Proceedings, Mobile Computing and Ambient Intelligence: The Challenge of Multimedia, Dated 2005.*
Lei Zhang, Bin Gongt, Shijun Liu "Pattern Based User Interface Generation in Pervasive Computing", IEEE, 2008.*
Jean Vanderdonckt, Francisco Montero Simarro "Generative Pattern-Based Design of User Interfaces", PEICS'10, Jun. 20, 2010, Berlin, Germany.*
Jurgen Engel "A Model- and Pattern-based Approach for Development of User Interfaces of Interactive Systems", EICS'10, Jun. 19-23, 2010, Berlin, Germany.*

* cited by examiner

*Primary Examiner* — Boris Gorney
(74) *Attorney, Agent, or Firm* — Brake Hughes Bellermann LLP

(57) ABSTRACT

A computer system includes a UI designer client that runs on a client device and is configured to enable creation of UI models. A client engine runs on a client device and is configured to initiate requests for the UI models, receive the UI models in response to the requests and interpret and render the UI models at runtime. A UI runtime server client is located on a server and is configured to interface with the client engine to receive and process the requests for the UI models from the client engine. A repository is located on the server and is configured to interface with the UI designer client and store the UI models as created using the UI designer client and interface with the UI runtime server client to deliver requested UI models to the UI runtime server client for interpretation and rendering by the client engine.

17 Claims, 8 Drawing Sheets

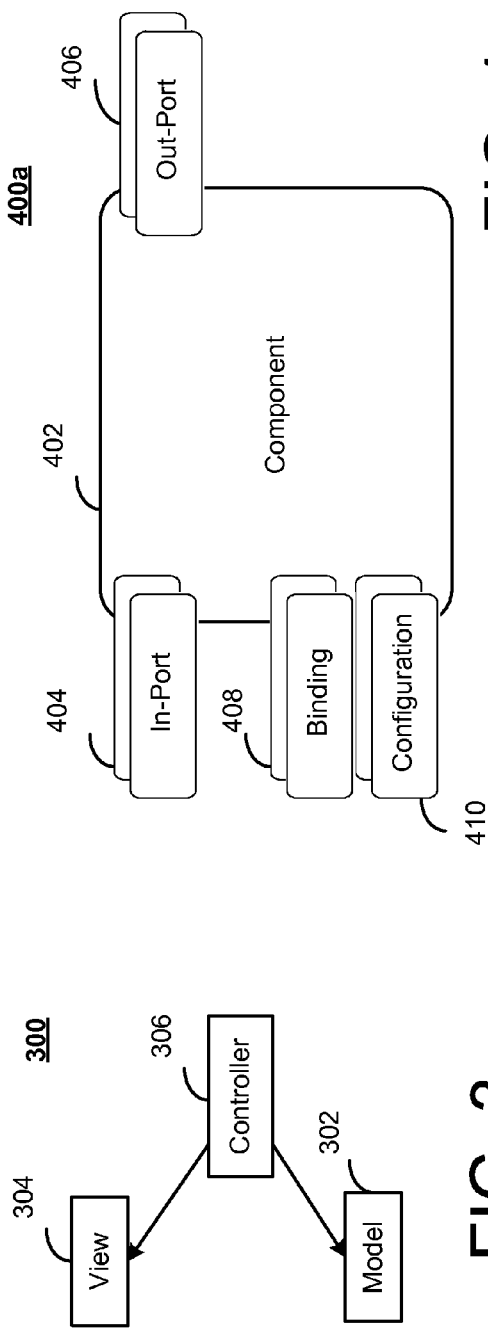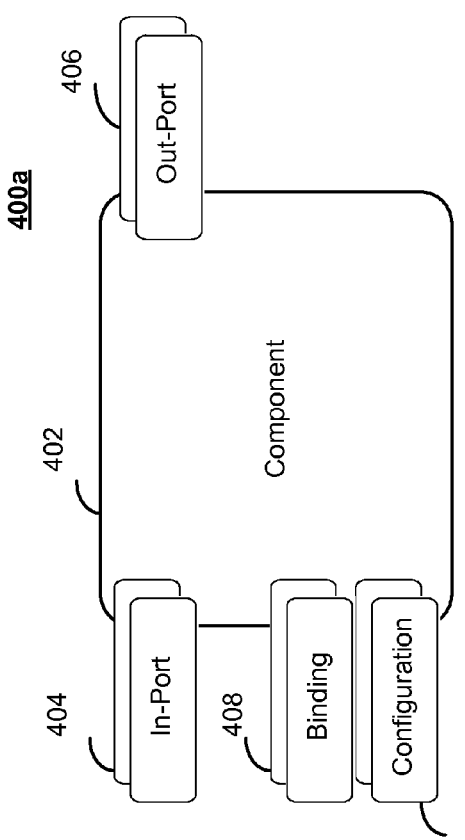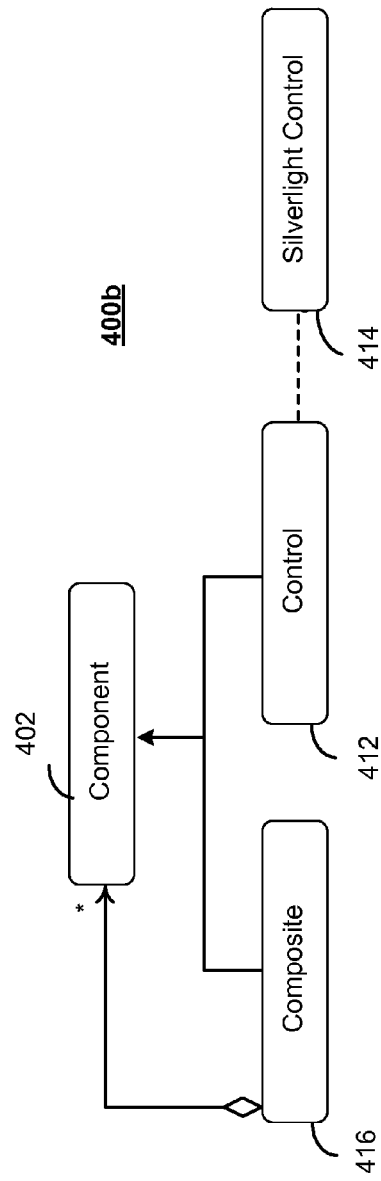

ARCHITECTURE FOR MODELED PATTERN BASED USER INTERFACES

TECHNICAL FIELD

This description relates to a system and techniques for a user interface architecture.

BACKGROUND

Many businesses and organizations may utilize services (e.g., software applications) that may be provided by one or more providers that may offer user interfaces (UIs) for accessing applications that may be customized for a particular user. Providers may find it desirable to provide a system and techniques that makes it easier for developers and other users to create and use these services and UIs.

SUMMARY

According to one general aspect, a computer system may include instructions stored on a non-transitory computer-readable storage medium and the computer system may include a user interface (UI) designer client that is arranged and configured to run on a client device on a client side of a network and to enable creation of UI models, a client engine that is arranged and configured to run on a client device on the client side of the network and to initiate requests for one or more of the UI models, receive the UI models in response to the requests and interpret and render the UI models at runtime, a UI runtime server client that is located on a server on a server side of the network and that is arranged and configured to interface with the client engine to receive and process the requests for the UI models from the client engine and a repository that is located on the server on the server side of the network. The repository may be arranged and configured to interface with the UI designer client and store the UI models as created using the UI designer client and interface with the UI runtime server client to deliver requested UI models to the UI runtime server client for interpretation and rendering by the client engine.

Implementations may include one or more of the following features. For example, the client engine may include multiple client engines with each of the client engines associated with a different customer, the UI runtime server client may be arranged and configured to interface with each of the client engines to receive and process the requests for the UI models from the client engines and the repository may be arranged and configured to maintain customer specific content in a layer separate from the UI models and to deliver requested UI models and customer specific content to the UI runtime server client for interpretation and rendering by a specific client engine. The UI models may be configured to be interpreted and rendered by the client engine independent of a technology used by the client engine. The client engine may be configured to run in a web browser. The client engine may be configured to run as a desktop client.

Each of the UI models may include a data model, the client engine may include a client controller and the UI runtime server client may include a server controller and a backend synchronization manager, where the backend synchronization manager may be arranged and configured to synchronize the client controller and the server controller using the UI data models. The UI model created using the UI designer client may be the same UI models that are interpreted and rendered by the client engine.

In another general aspect, a non-transitory recordable storage medium may have recorded and stored thereon instructions that, when executed, perform the actions of running a user interface (UI) designer client on a client device on a client side of a network, the UI designer client configured to enable creation of UI models, running a client engine on a client device on the client side of the network, the client engine configured to initiate requests for one or more of the UI models, receive the UI models in response to the requests and interpret and render the UI models at runtime, running a UI runtime server client that is located on a server on a server side of the network, the UI runtime server client being configured to interface with the client engine to receive and process the requests for the UI models from the client engine and managing a repository that is located on the server on the server side of the network. The repository may be configured to interface with the UI designer client and store the UI models as created using the UI designer client and interface with the UI runtime server client to deliver requested UI models to the UI runtime server client for interpretation and rendering by the client engine.

Implementations may include one or more of the following features. For example, the client engine may include multiple client engines with each of the client engines associated with a different customer, the UI runtime server client may be arranged and configured to interface with each of the client engines to receive and process the requests for the UI models from the client engines and the repository may be arranged and configured to maintain customer specific content in a layer separate from the UI models and to deliver requested UI models and customer specific content to the UI runtime server client for interpretation and rendering by a specific client engine. The UI models may be configured to be interpreted and rendered by the client engine independent of a technology used by the client engine. The client engine may be configured to run in a web browser. The client engine may be configured to run as a desktop client.

Each of the UI models may include a data model, the client engine may include a client controller and the UI runtime server client include a server controller and a backend synchronization manager, where the backend synchronization manager may be arranged and configured to synchronize the client controller and the server controller using the UI data models. The UI model created using the UI designer client may be the same UI models that are interpreted and rendered by the client engine.

In another general aspect, a computer system may including instructions stored on a non-transitory computer-readable storage medium, where the computer system includes multiple user interface (UI) client engines, where each of the client engines is associated with a different customer and each of the client engines is arranged and configured to run on a client device on the client side of the network and to initiate requests for one or more UI models, receive the UI models in response to the requests and interpret and render the UI models at runtime, a UI runtime server client that is located on a server on a server side of the network and that is arranged and configured to interface with each of the client engines to receive and process the requests for the UI models from the client engines and a repository that is located on the server on the server side of the network. The repository is arranged and configured to store the UI models and interface with the UI runtime server client to deliver requested UI models to the UI runtime server client for interpretation and rendering by a requesting client engine.

Implementations may include one or more of the following features. For example, the repository may be arranged and configured to maintain customer specific content in a layer separate from the UI models and interface with the UI runtime server client to deliver requested UI models and customer specific content to the UI runtime server client for interpretation and rendering by the requesting client engine. Each of the UI models may include a data model, the client engine may include a client controller and the UI runtime server client may include a server controller and a backend synchronization manager, where the backend synchronization manager may be arranged and configured to synchronize the client controller and the server controller using the UI data models. The UI runtime server client may be configured to interpret and render the UI models. Each of the client engines may be configured as a plug in to a browser. Each of the client engines may be configured as part of a non-browser, desktop application.

The details of one or more implementations are set forth in the accompanying drawings and the description below. Other features will be apparent from the description and drawings, and from the claims.

BRIEF DESCRIPTION OF THE DRAWINGS

FIG. 3 is a block diagram of an example model-view-controller structure.

FIGS. 4a-4b are block diagrams illustrating an example component structure.

DETAILED DESCRIPTION

This document describes systems and techniques for an architecture for a user interface (UI) system. The UI system may include a UI designer client that is configured to run on a client device of a client side of a network, where the UI designer client enables developers and other users to create and modify UI models. The UI system may include a client engine that is configured to run on a client device on the client side of the network, where the client engine enables users to initiate requests for one or more of the UI models, receive the UI models and interpret and render the UI models at runtime on the client device. The UI system may include a UI runtime server client that is configured to run on a server on a server side of the network, where the UI runtime server client is configured to interface with the client engine and to receive and process the requests for the UI models from the client engine. The UI system may include a repository that is located on the server on the server side of the network, where the repository is configured to interface with the UI designer client and to store the UI models created using the UI designer client. The repository is configured to interface with the UI runtime server client to deliver requested UI models to the UI runtime server client for interpretation and rendering by the client engine. Many features and various implementation of the UI system, its related architecture and techniques are described in more detail below.

Figure 1A:
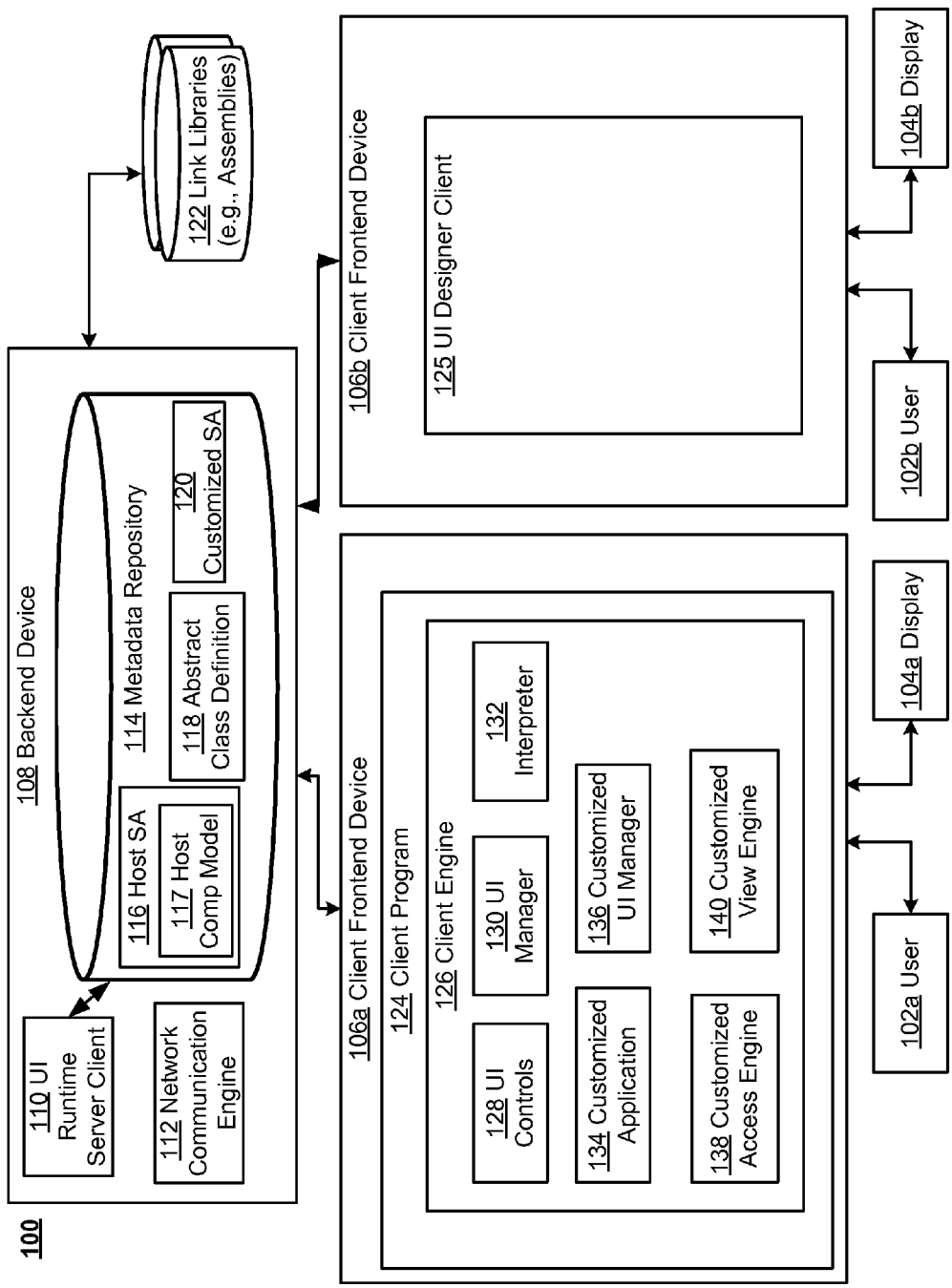
FIG. 1A is an exemplary block diagram of a user interface (UI) system.

Referring to FIG. 1A, a block diagram of an exemplary system 100 for providing user interface (UI) applications at a client device. Many businesses and organizations may utilize services (e.g., software applications) that may be provided by one or more providers that may offer user interfaces (UIs) for accessing applications that may be customized for a particular user. For example, a user may desire access via a client device to customer invoice applications that are customized to that particular user. As other examples, the user may also desire access to applications for managing customer relationships, financial management, management of projects, management of supply chain networks, management of supplier relationships, support for executive management, and management of compliance with laws and regulations. Customization may be furnished by the provider, or the user may have a capability to customize particular aspects of an application or service. Further, the provider may host the software and associated data on one or more provider devices including host servers. The users may then access the services via remote connections (e.g., via the Internet) using various client devices (e.g., a server local to the user with connecting devices, desktop computers, laptop computers, handheld devices, etc.). The users may then be able to access powerful functionality (e.g., business processes) without requiring a significant up-front investment by the user in extensive Information Technology (IT) personnel and equipment, for example, as part of the user's business setup.

In the example of FIG. 1A, the system 100 allows a user to generate and run customized applications based on the data and functionalities provided on a backend by the applications associated with UIs, on client devices. By generating and running such customized applications in a client program such as, for example, a browser application, a desktop application or other application on the client device, the user may save significant resources in programming time and system resources, by reusing objects already developed, via an interface based on abstract class definitions to provide access to data and functionality of the UI applications. Thus, the user may obviate a need to generate applications from scratch, and obtain customized views and other customized results, using the same data and functionality already in place for the UI applications.

For example, a user may prefer a visualization of list data for attachments files in an icon view instead of simple list format. As another example, a user may prefer a customized navigation and presentation of a search result in a specific way that may be different from preferences of other users. As another example, an application help system implementation may be configured to display arbitrary Hyper Text Markup Language (HTML) content (from a centralized component) based on the component context.

As yet another example, an opportunity pipeline implementation may display a list of opportunities in a sales funnel view for a particular user. As another example, a customized implementation may provide a visualization of the browsing of dates for timesheet recording in a customized layout for a particular user. As yet another example, a user may prefer a visualization of an aggregation of a standard list in a graphical view, for example, using piecharts. As yet another example, a user may prefer a choice of viewing a list of reports or a gallery view of reports.

For example, a UI application may provide a browser window of shop floor information in a UI application. However, a user on a shop floor may not have time to stand at a client device display screen to view the window and find displayed graphical buttons that the user may need to click based on various events on the shop floor over time. Thus, the user may benefit from having a larger screen display of the same data, with the same functionality, but perhaps having much larger buttons, displayed in prominent locations, so that the user may be able to view the screen from a distance and may quickly select large buttons to push based on shop floor events. For example, a large red button may be easily recognized and clicked to trigger emergency responses in cases of emergencies on the shop floor, whereas a large green button may be easily recognized as a "green light" button to be clicked to trigger "acceptable" responses to acceptable events on the screen floor. The functionality provided by displaying and clicking such buttons may be the same for the UI application and the customized application, but the customized application may generate a different view for the user that may be easier for that particular user to use in the user's working environment. According to an example embodiment, the customized application may obtain access to the data and functionality of the UI application via an interface based on one or more abstract class definitions.

In this context, example entities such as software objects may be declared based on class definitions. Such class definitions may define structure for the software objects or other entities, at least including data and operations used by the software objects or entities. At runtime, the software objects or entities may be instantiated to generate an executable entity that may access the declared data and operations associated with the class definition. Abstract classes may be declared based on various data elements and operations of other entities, to expose, or provide access to selected data and/or operations of the other entities. Such abstract classes may not be instantiated, but may be referenced in declarations of other entities such as class definitions of other software objects, to provide runtime access to the declared data and functionality of the entities that form the basis of the declarations of the abstract classes. For example, this type of access may be accomplished by generating links or paths to link libraries or assemblies generated in association with the design of the UI applications.

In FIG. 1A, one or more users 102a and 102b may use respective display devices 104a and 104b while connected locally to respective client frontend devices 106a and 106b to use user interface applications and customized applications that may be stored and served from a backend device 108. Client frontend devices 106a and 106b also may be referred to simply as client devices and the backend device 108 may be referred to as a server. A UI runtime server client 110 may manage operations on the backend device 108, and a network communication engine 112 may manage communication between the backend device 108 and the frontend devices 106a and 106b, via a network protocol, e.g., Hypertext Transfer Protocol (HTTP) or Hypertext Transfer Protocol Secure (HTTPS).

A metadata repository 114, also referred to as a repository, may store information related to the UIs, such as metadata representations of the UIs that may be sent to client frontend devices for interpretation for executing the UIs on the client frontend devices 106a and 106b. Since the UI information is stored on the backend device 108, one or more representations of UIs may be viewed (as an aggregate of the UI's metadata) as a host software application 116 that is downloaded to client frontend devices 106 for interpretation and execution. According to an example embodiment, the UI metadata may be implemented in eXtensible Markup Language (XML), and may include descriptive data such as processes to be executed, display information such as buttons, data entry fields, display fields, and information related to input/output data associated with the UI. According to an example embodiment, the host software application 116 may include a host component model 117, as discussed further herein.

In another exemplary implementation, the structure for UI components may be described in a XSD-schema, which may be utilized to generate an object-model in the respective programming language, which can then be used to serialize and deserialize the UI components.

The metadata repository 114 also may store one or more abstract class definitions 118, that may be based on data and or operations of one or more of the host software applications, or other entities. Further, the metadata repository 114 may store one or more customized software applications 120 based on one or more of the host software applications 116, via one or more abstract class definitions 118. For example, a host sales order UI application 116 may access data and functionality for displaying queries to a user, and for receiving input related to particular sales orders. An abstract class definition 118 may provide access to the data and functionality of the host UI application 116, and one of the customized software applications 120 may provide a different, customized view to the user 102a, of the same data and functionality provided by the host UI application. For example, the user 102a may view a display of a pane showing line-by-line numbers associated with sales orders in a browser window that is generated based on the host UI application 116, and may simultaneously view a custom pane of the same information, but displayed as a customized bar graph in the custom pane.

All of the UI entities may be stored in the metadata repository 114. The metadata repository 114 may support layering, meaning that different layers of content may be separated from one another and made accessible only to designated users. For example, developer content may be in one layer, customer content in another layer and partner content in yet another layer of the same metadata repository 114. The metadata repository 114 may be configured to store content from multiple, different customers in the same repository. In this manner, multiple different client devices may access the same backend device 108 and the same metadata repository 114. One or more of the UI models stored in the repository 114 may be accessible by the different client devices, but the specific customer content may only be accessible by the respective customer.

Layering in the metadata repository 114 also allows a component to be viewed by its logical address with different content based on the actual layer strategy. The layer strategy may define the sequence of potential layers for a user, company or partner solutions. This can either be on object shadowing the content of the lower layer or it could be a merged view with adoptions stored in higher layers and the original content in a lower layer.

Link libraries 122 associated with the host software applications 116 and customized software applications 120 may be stored in the metadata repository 114, or may be stored in repositories local to the backend device 108, or remote from the backend device 108 (e.g., via networks such as the Internet). For example, the link libraries 122 may include Dynamic Link Libraries (dll's) and/or assemblies that may include data and/or code available at link time for applications that reference the link libraries.

The client frontend device 106a may include a client program 124 that may be used for executing processes associated with the UIs, for sending information to the user 102a, for receiving input from the user 102a, and for displaying images on the display 104a for the user, as well as managing a flow of information between the client program 124 and the backend device 108. For example, the client program may include a browser, such as Internet Explorer, Firefox, or Chrome. For example, a browser may include a plugin such as Microsoft Silverlight to handle execution of the processes associated with the UIs and displaying information on the display 104a for the user 102a. Such a client program or browser plugin may include a graphical subsystem for rendering user interfaces in Windows-based applications, which may provide a consistent programming model for building applications and provide a clear separation between the user interface and business logic. Using such a browser plugin, for example, may eliminate a need for a Java stack (e.g., a Java J2EE server stack) for execution of processes on the client frontend device 106a, thereby providing an environment using a more lean stack for execution and communication. Such an environment may provide a more efficient and more timely execution of processes related to the needs of the user 102a.

In an example implementation, the client program may be run independently of a browser. For example, the client program may be a program that runs as a desktop client such as an application that interfaces directly with the operating system of the client device. Other applications that may be used may include ASP.NET, Flash, or Java (e.g., Java EE 6). In another implementation, the client program may be a program that runs as a mobile client for use on mobile devices such as, for example, smart phones, personal digital assistant, laptops and cellular phones.

A client engine 126 may be configured to initiate requests for one or more of the UI models. The client engine 126 may receive the UI models in response to the requests and render the UI models at runtime. The client engine 126 may include UI controls 128, a UI manager 130, and an interpreter 132. The UI controls 128 may be configured to manage control structures related to a UI (e.g., input fields, drop boxes, tables, charts, etc.). The UI manager 130 may be configured to manage interpretation of the UIs via the interpreter 132, as well as any input and output between the UIs and the user 102a or operations between the UI and the backend device 108. For example, the UI manager 130 may receive a metadata representation of a UI, and may request its interpretation via the interpreter 132 so that a graphical display may be rendered on the display device 104a for interaction with the user 102a.

The client engine 126 may further include a customized application 134 that may include information for executing a customized view of a host application 116 for a particular client user. Information associated with the customized application 134 may be stored in the metadata repository 114 (e.g., the customized software application 120) for retrieval by the client engine 126 for loading and execution via the interpreter 132. For example, the customized application 134 may be configured to access data and/or functionality provided by one or more host software applications 116 via one or more abstract class definitions 118.

A customized user interface manager 136 may be configured to initiate execution of a customized application (e.g., the customized application 134) that is declared based on an abstract class definition (e.g., the abstract class definition 118) derived from a declared host component model 117 associated with a host software application (e.g., the host software application 116) implementing one or more business processes and providing a graphical display associated with a user interface (UI) for a user in a client program executing on a client frontend device that is separate from a backend device storing metadata associated with the UI for the client frontend device, the metadata including a declaration of the declared host component model and a declaration of the abstract class definition.

According to an example embodiment, the customized user interface manager 136 may be configured to receive a model of the customized application 120 and interpret the model of the customized application 120 for execution by the client program 124 (e.g., via the interpreter 132).

A customized access engine 138 may be configured to obtain access to data and functionality of the host software application 116 via the customized application 120, as discussed further herein. A customized view engine 140 may be configured to provide customized output for the user 102a that is different from host output provided by the host software application 116, the customized output generated by the customized application 134 accessing, via the abstract class definition 118, the declared host component model, for accessing the same data and functionality that is accessed by the host software application 116, as further discussed herein.

According to an example embodiment, the customized output for the user may include visual output displayed on the graphical display, and the client program may be a browser. For example, the customized output for the user may include at least one custom pane displayed on the graphical display that is a different arrangement of data that is displayed by executing the host software application 116. For example, the host software application 116 may provide a display of a list of numbers, while the customized output may include a simultaneously displayed custom pane showing bar charts generated from the same data and functionality used by the host software application 116 for its display of the list of numbers.

According to an example embodiment, the customized output for the user may include nonvisual output. For example, the customized output for the user may include triggering an event and storing a result of the event in a database. For example, the user may wish to initiate a query and store results of the query in a user database, based on events that may occur during execution of the host software application 116. The customized application 134 may thus be configured to receive an alert from the functionality of the host software application 116, and may determine whether the query should be processed, and may store query results, if desired, without visual output to the user 102.

According to an example embodiment, the declared host component model 117 may include a controller declaration configured to indicate one or more run-time event handlers, a data model declaration configured to indicate a structural description of data associated with the declared host component, an input port declaration configured to indicate one or more run-time inputs to the declared host component, and an output port declaration configured to indicate one or more run-time outputs from the declared host component, as discussed further below.

The client frontend device 106b may include a UI designer client 125. The UI designer client 125 may be a design time application, which may be an application that is used to develop and maintain an end-to-end user interface (UI). The design time application may be an integrated tool that allows the creation and maintenance of a UI, including all of the UI components forming UI models, end-to-end starting from early mockups and through an entire development process. The UIs may be modeled and controller logic for the UIs may be implemented in the UI designer client 125.

In one exemplary implementation, the UI designer client 125 may be accessed and used as a stand-alone application, through a browser or as a plug-in to other application programs, including as a plug-in to a browser. For example, the design time application may be used with an application programs such as an Internet web-browser such as the FIREFOX web browser, the APPLE SAFARI web browser, the MICROSOFT INTERNET EXPLORER web browser, or the GOOGLE CHROME web browser.

The UI designer client 125 may be configured as a single design tool to enable different users having different roles to access and create UI components, as may be appropriate to their role. Each role may include one or more different views in the design time application and may include different data rights and access rights. The UI designer client 125 is configured to support specific views tailored for specific roles and to provide collaboration tools and a collaboration environment to support the overall development process for UI components. The UI designer client 125 may be configured to enable visual editing, including drag and drop features and in-place text editing.

In one exemplary implementation, the UI designer client 125 may be implemented using a .NET framework-based platform. In other exemplary implementations, the design time application may be implemented using a different framework or combinations of frameworks.

The UI designer client 125 may interface and communicate with the metadata repository 114 on the backend device 108. The UI designer client 125 is configured to read data from the metadata repository 114 and is configured to write data to the metadata repository 114. In this manner, the UI designer client 125 is used to create UI models, which are stored in the metadata repository 114. The same UI models may then be delivered to the client engine 126 through the UI runtime server client 110 in response to a request. The client engine 126 then interprets the UI model and renders the UI model on a display 104*a* for the user 102*a*. Thus, the same UI models are used by both the UI designer client 125 and the client engine 126.

The UI designer client 125 may be configured to browse the UI components stored in the repository 114. The listed UI components may include different types of UI components and the UI components may be selectable by a user 102*b* for display in the UI designer client 125 on display 104*b*. A selected UI component loaded into the UI designer client 125 and may be modified by a user having an appropriate role and/or rights. In addition to selecting and modifying an existing component stored in the metadata repository 114, a new UI component may be created using the UI designer client 125 and the new UI component may be written to the metadata repository 114.

The client engine 126 may be part of a lean stack. The use of the client engine 125 combined with the UI runtime server client 110 and the metadata repository 114 enables multiple client engines 126 to connect to the same UI runtime server client 110 and the same metadata repository 114 while maintaining full separation of customer-specific content and providing personalization and flexibility features for each customer. The need for a dedicated UI server for each client engine 126 is eliminated. The UI runtime server client 110 also interprets the UI models on the backend device 108 and provides a consumption layer for business object (BO) services.

Figure 1B:
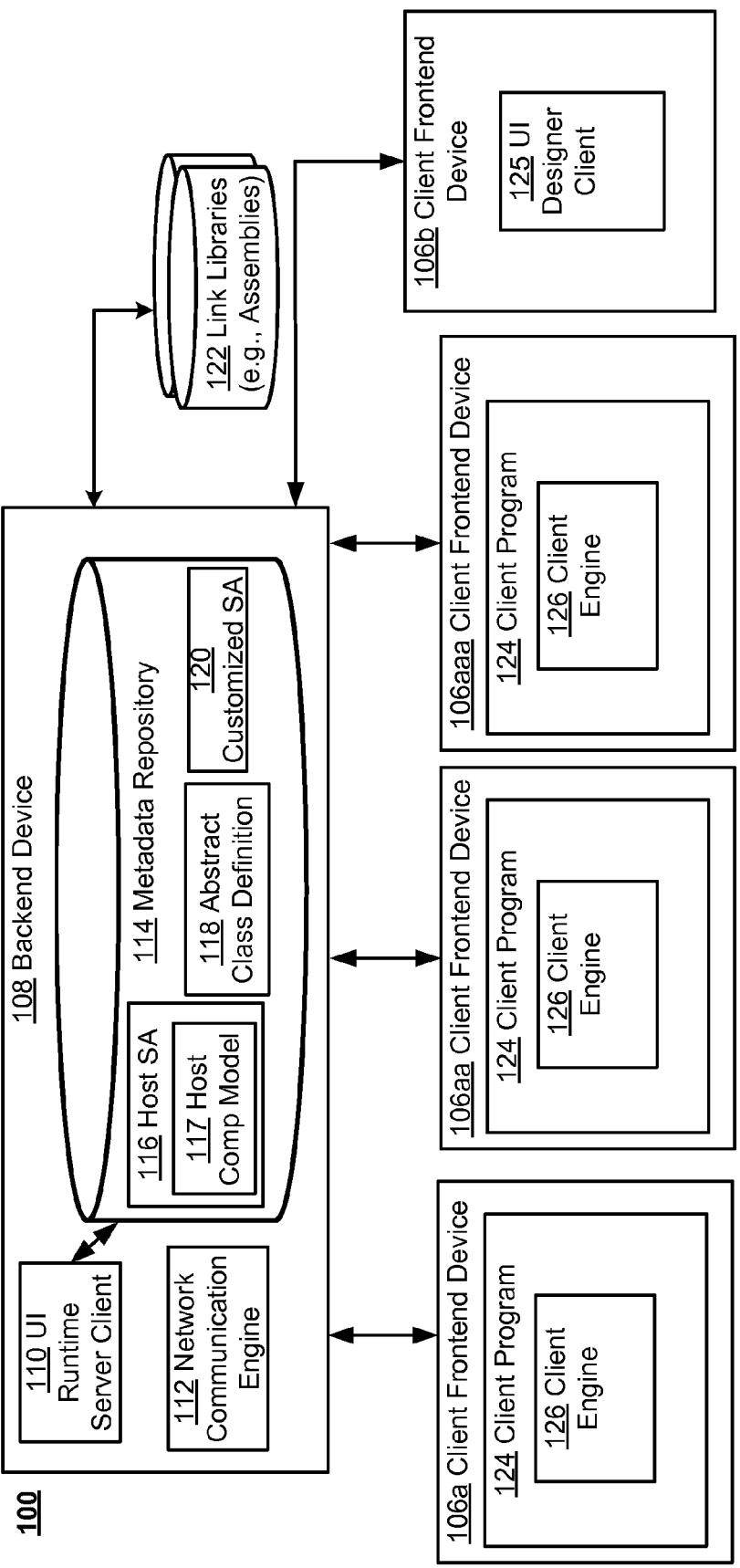
FIG. 1B is an exemplary block diagram of the UI system of FIG. 1A illustrating multiple client devices interfacing the backend device.

Referring to FIG. 1B, an exemplary block diagram illustrates the system 100 from FIG. 1A having multiple client devices 106*a*, 106*aa*, and 106*aaa* accessing the same backend device 108, including the metadata repository 114. Each of the client devices 106*a*, 106*aa* and 106*aaa* includes the client engine 126, which along with the client program 124, enables access to the backend device 108 and its components, including the metadata repository 114. While only three client devices 106*a*, 106*aa*, and 106*aaa* are illustrated, many multiple client devices may interface with the same backend device 108. Each of the client devices may be associated with the same customer or different customers of a combination of both.

Figure 2:
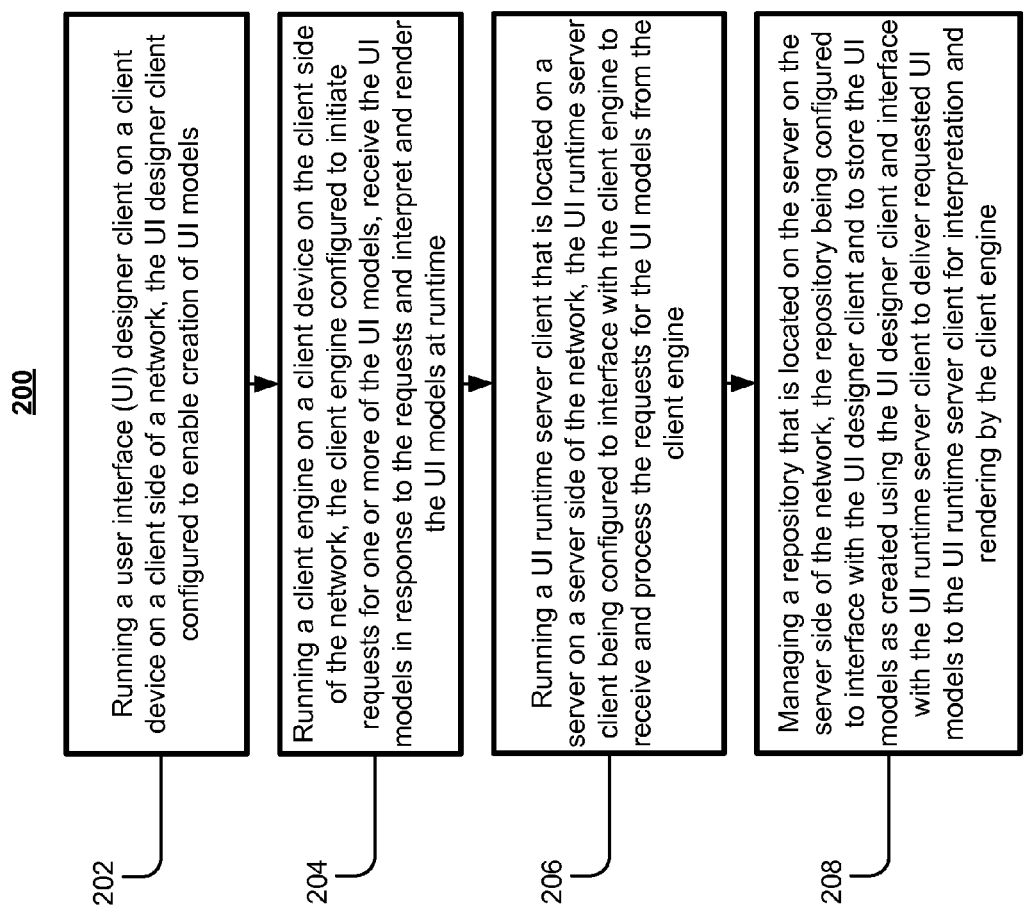
FIG. 2 is a flowchart illustrating example operations of the system of FIGS. 1A and 1B.

FIG. 2 is a flowchart of an exemplary process 200 of the system 100 of FIGS. 1A and 1B. Process 200 may include running a UI designer client on a client device on a client side of a network, where the UI designer client is configured to enable creation of UI models (202). For example, as discussed above, the UI designer client 125 may run on a client device 106*b*. The UI designer client 125 is configured to enable a user to create and modify UI models, as discussed above with respect to FIGS. 1A and 1B.

Process 200 may include running a client engine on a client device on the client side of the network, where the client engine is configured to initiate requests for one or more UI models, receive the UI models in response to the requests and interpret and render the UI models at runtime (204). For example, the client engine 126 may run on the client device 106*a*. The client engine 126 may run in a UI client program 124, such as a browser or it may run as part of a different stand-alone application. The client engine 126 receives input from a user 102*a* interacting with the client device 106*a* and initiates requests for one or more UI models. The client engine 126 receives the UI models in response to the requests, interprets the UI models and renders the UI models at runtime for display to the user.

Process 200 may include running a UI runtime server client that is located on a server on a server side of the network, where the UI runtime server client is configured to interface with the client engine to receive and process the requests for the UI models from the client engine (206). For example, the UI runtime server client 110 may be located on the backend device 108. The UI runtime server client 110 receives the requests for the UI models from the client engine 126 and processes the requests.

Process 200 may include managing a repository that is located on the server on the server side of the network, where the repository is configured to interface with the UI designer client and to store the UI models as created using the UI designer client and to interface with the UI runtime server client to deliver requested UI models to the UI runtime server client for interpretation and rendering by the UI client (208). For example, the metadata repository 114 is located on the backend device 108 along with the UI runtime server client 110. The repository 114 interfaces with the UI designer client 125 and stores the UI models that are created using the UI designer client 125. The repository also interfaces with the UI runtime server client 110 to deliver requested UI models to the UI runtime server client 110 for interpretation and rendering by the client engine 126. The UI runtime server client 110 also may be configured to interpret and render the UI models.

The UI runtime server client 110 is synchronized with the client engine 126. In one exemplary implementation, the UI runtime server client 110 may deliver only the data and UI models portions needed to be rendered at a particular instance by the client engine 126. In this manner, the amount of data and traffic between the client device 106*a* and the backend device 108 may be reduced to just that necessary for the client engine 126 to perform its functions.

FIG. 3 is a block diagram of an example model-view-controller structure 300. Model-view-controller (MVC) is an architectural pattern used in software engineering. In an MVC context, a model 302 may represent information or data of an application. A view 304 may correspond to elements of a user interface such as text, buttons, checkbox items, etc. A controller 306 manages the communication of data and the rules used to manipulate the data to and from the model. FIG. 3 shows the dependencies among the model 302, view 304, and the controller 306. One goal achieved using this structure is to achieve a single roundtrip with respect to transporting data between the client device and the backend device. For every user interaction, only the bare minimum of data needed to render the current UI state is transported to the client engine on the client device.

FIGS. 4a-4b are block diagrams illustrating an example component structure. According to an example embodiment, a UI component 402 may include a self contained model of a UI that may be declaratively used in another UI model. A declarative interface 400a of a UI component 402 may include in-ports 404 and out-ports 406. These ports may be used to implement a loosely coupled behavior in embedding or navigation scenarios. The data of a loosely coupled component may be loaded asynchronous (i.e., an additional roundtrip between the frontend and backend may be needed). The declarative interface 402 may also include binding 408, for tightly coupled behavior in embed scenarios (e.g., synchronous loading), working directly on the data model of a parent UI model (e.g., via references to the parent data model). The declarative interface 400a may also include configuration 410. A technical configuration may be exposed, e.g., to enable a user to support different styles/flavors, e.g., statically set at design time.

As shown in a logical component model 400b of FIG. 4b, a component 402 may be a control 412 provided by a system framework or implemented in association with framework controls (e.g., a Silverlight control 414). A component 402 may be a composite 416 (e.g., composite control, building block, etc.) which may include other components (e.g., nested composites and/or controls). Components 402 may expose an interface or interfaces for actions, ports and bindings. A composite may be used and configured in a view-composition or used as the target of a navigation as a standalone UI application. The configuration of a non-framework component may be generated via the exposed declared interface. The UI component is a self-contained model of a UI that can be declaratively used in another UI model. A component can be a control, provided by the framework or implemented with some SDK/API for framework controls.

Figure 5:
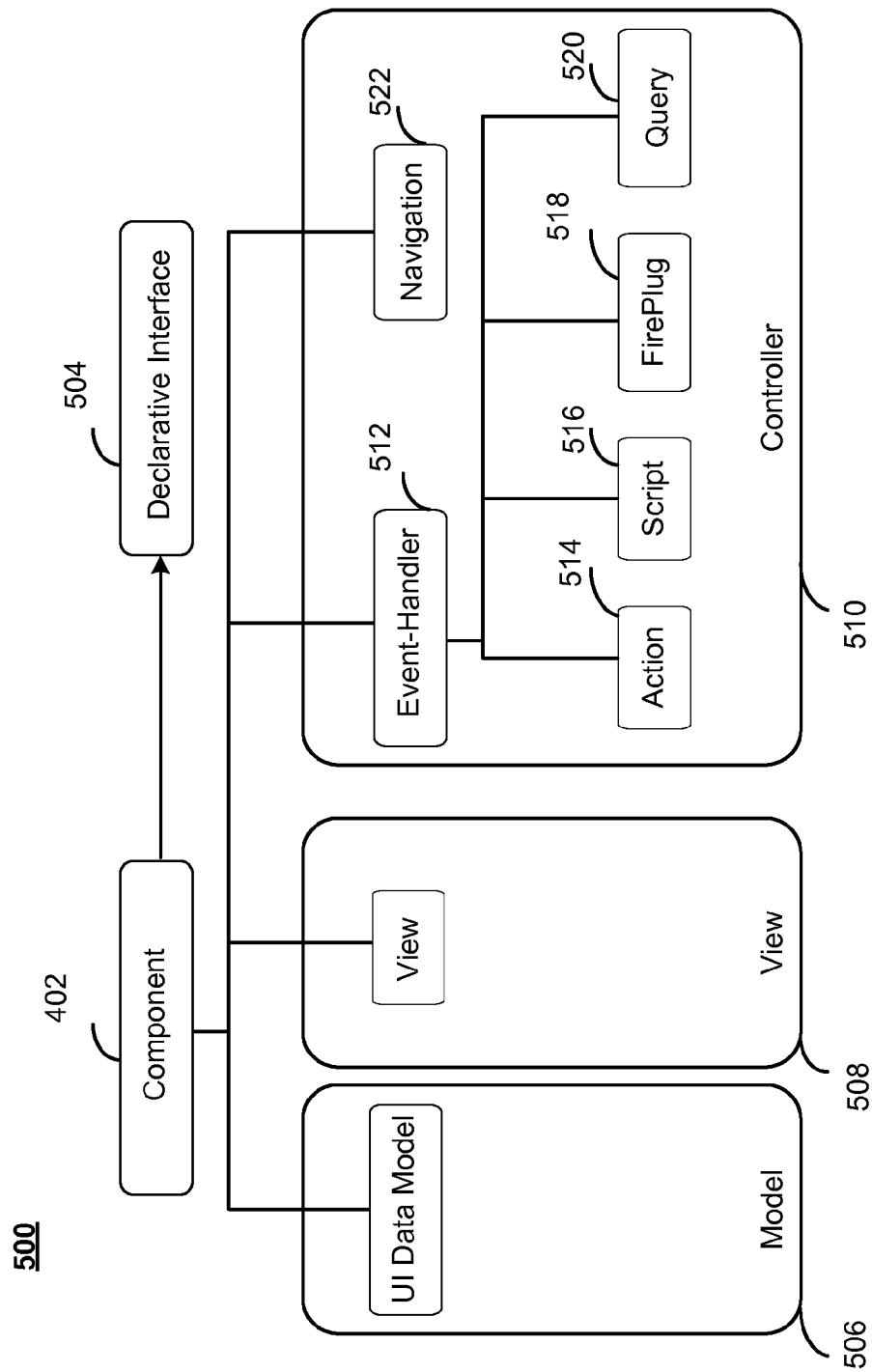
FIG. 5 is a block diagram of an example declarative interface structure for components.

FIG. 5 is a block diagram of an example declarative interface structure 500 for components. A component 402 may include a declarative interface 504, a model 506, a view 508, and a controller 510. For example, a view 508 may include a description of the user interface which binds to a UI data model 506 and triggers event-handlers 512. The UI data model 506 may describe data structure, which can bind to backend data. The controller 510 may recognize various types of event-handlers 512 such as business object actions 514, script 516, plug-operations 518 and queries 520. According to an example embodiment, navigation 522 may include a context-mapping for outplug-inplug-operations. The declarative interface 504 may expose ports, binding-capabilities and configuration to the composition environment.

Figure 6:
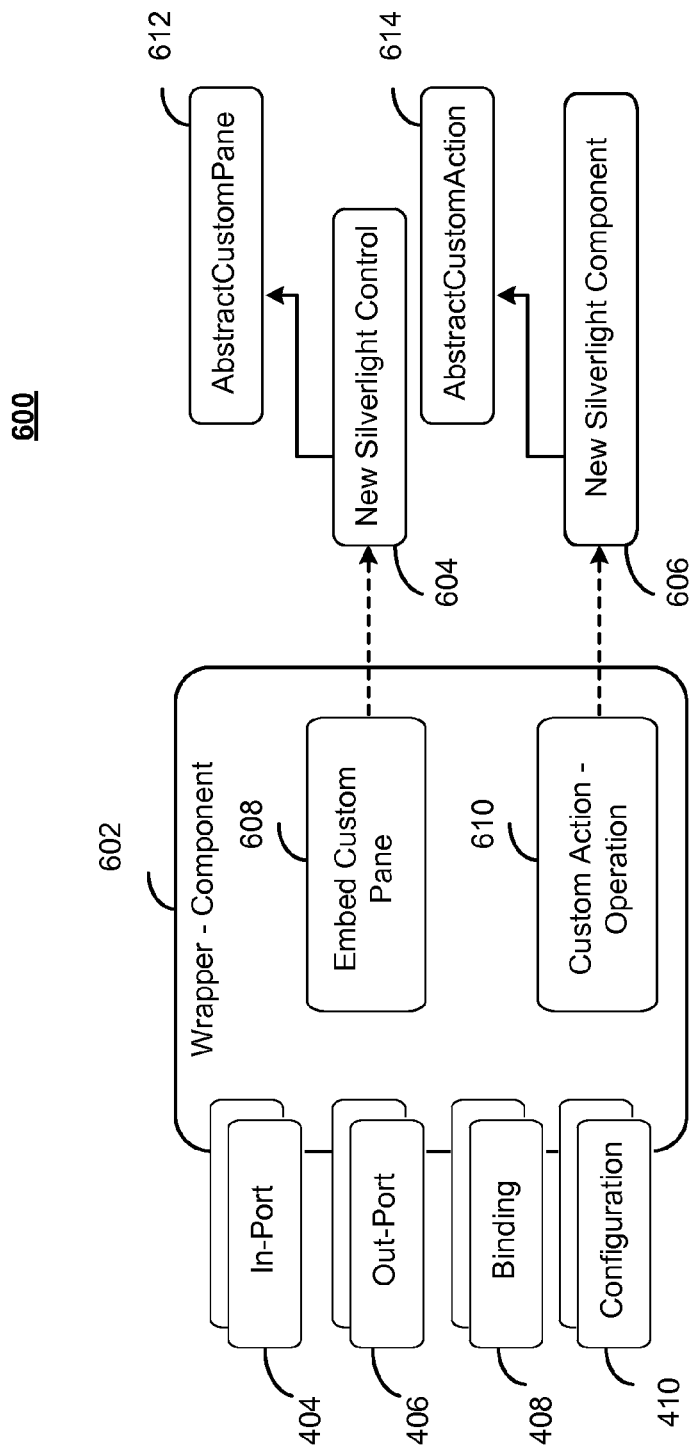
FIG. 6 is a block diagram of an example structure for a component wrapper.

FIG. 6 is a block diagram of an example structure 600 for a component wrapper 602. According to an example embodiment, native Silverlight components may be generated (e.g., Silverlight control 604, Silverlight component 606) which can interact with the component data model and may participate in events. A developer may implement interfaces and use these components via a custom pane 608 in an EmbedComponent-Type, and via a custom action operation 610, respectively. Through this a declared interface wrapper may use these components in other components. Custom panes may be utilized via EmbedComponents and may be associated with a control derived from AbstractCustomPane 616 for controls or from Abstract CustomAction 614 for action components. According to an example implementation, custom panes that are configured in EmbedComponents may point to an assembly name and class type name of a control derived from the framework AbstractCustomPane. Embedcomponents may be used in other components, as this provides a capability at designtime to reflect on the declarative interface of the wrapper component.

Figure 7:
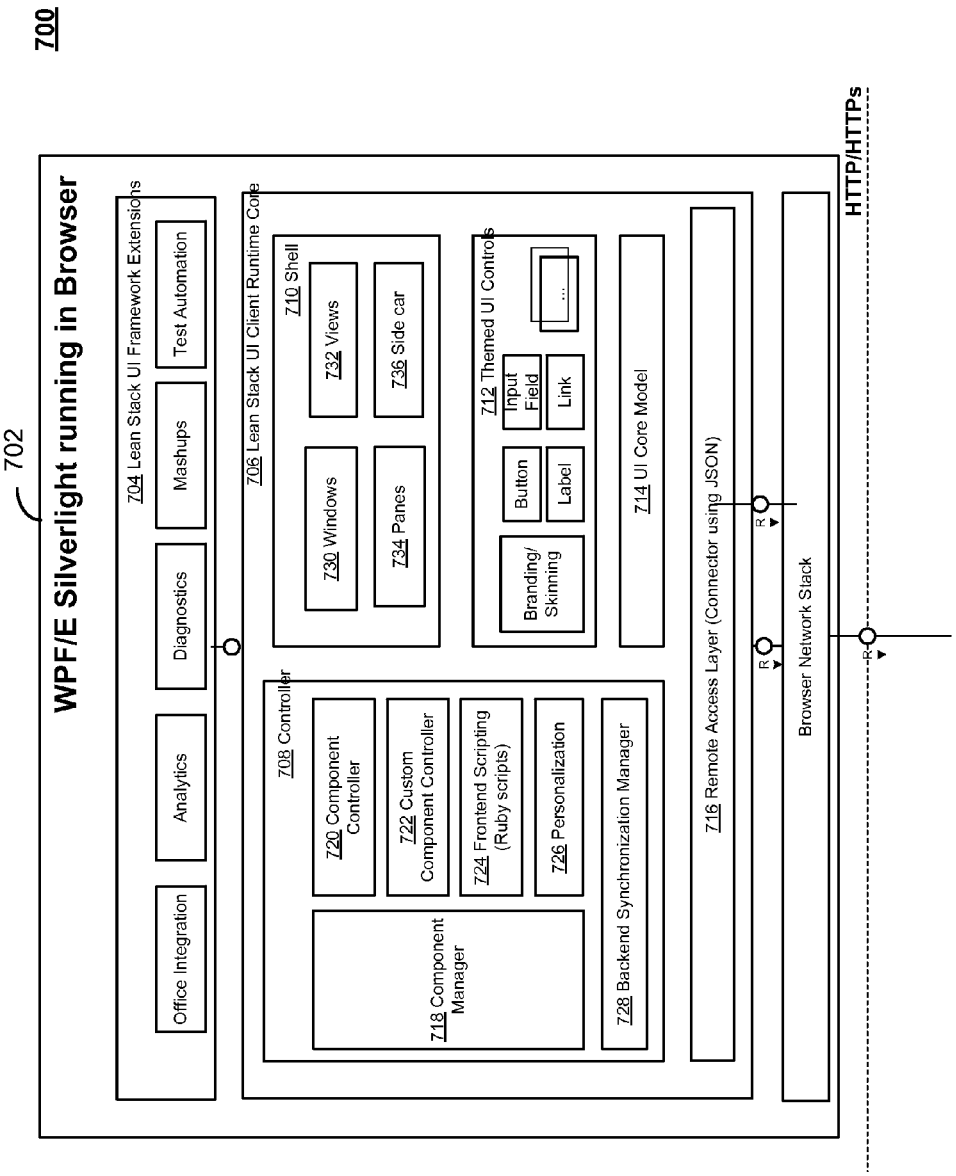
FIG. 7 is a block diagram of an example runtime client.

FIG. 7 is a block diagram of an example runtime client 700. As shown in FIG. 7, Silverlight 702 is running in the client program (e.g., a browser). The system includes lean stack UI framework extensions 704. The system further includes a lean stack UI client runtime core 706, which includes a controller 708, a shell 710, themed UI controls 712, a UI core model 714, and a remote access layer 716. The controller 708 includes a component manager 718 for managing components, which were discussed previously. The controller 708 also includes a component controller 720, a custom component controller 722, a frontend scripting engine 724, a personalization engine 726, and a backend synchronization manager 728. The shell 710 includes windows 730, views 732, panes 734, and side cars 736.

User requests may be triggered on the client side during UI runtime. The first user request may be a navigation request that results in a request to the backend to read a UI component. The UI component is read from a central metadata repository in the backend and transported to the frontend. The component manager 718 may instantiate the UI component and a corresponding component controller 720 for the UI component on the client side and triggers the initialization of the UI component on the backend side. The component manager 718 generates a control tree for the UI component out of the controls provided in a central "Themed Controls" 712 package. These controls ensure uniform look and feel and the ability to change themes consistently. The controls in the "themed UI controls" package may be enabled in a consistent way for test automation and accessibility, and may be provided in a manner such that all native implemented custom UI panes may use the controls. More than one UI component may be needed to render a UI, as UI components may embed other UI components (e.g., a Work Center component may embed a Work Center View Component and they again may embed OWL components, etc.). The top-level UI component that is rendered is a root UI component which renders a common frame for all UI components, e.g., by rendering the top level navigation and has an ability to open a side car for personalization and help.

For each UI component the "generic" component controller 720 for that particular component is instantiated. If a custom UI pane is to be rendered then a corresponding custom component controller 722 may be instantiated. The component controller 720 ensures that all controls are bound to the proper fields of the UI model and executes all operations that are configured in the event handlers of the UI component. If, some script segments are discovered in the event handlers, the controller triggers the execution of these scripts in the frontend scripting engine 724. The component controller 720 may also trigger a roundtrip to the backend device. In that case the backend synchronization manager 728 identifies all changed data in the UI data model in the client and packs only the changed data in a request to the backend. After the backend controller computes the data in the backend all changed data and only the changed data from the backend (including all data changed via side effects) may be transported back to the frontend.

Figure 8:
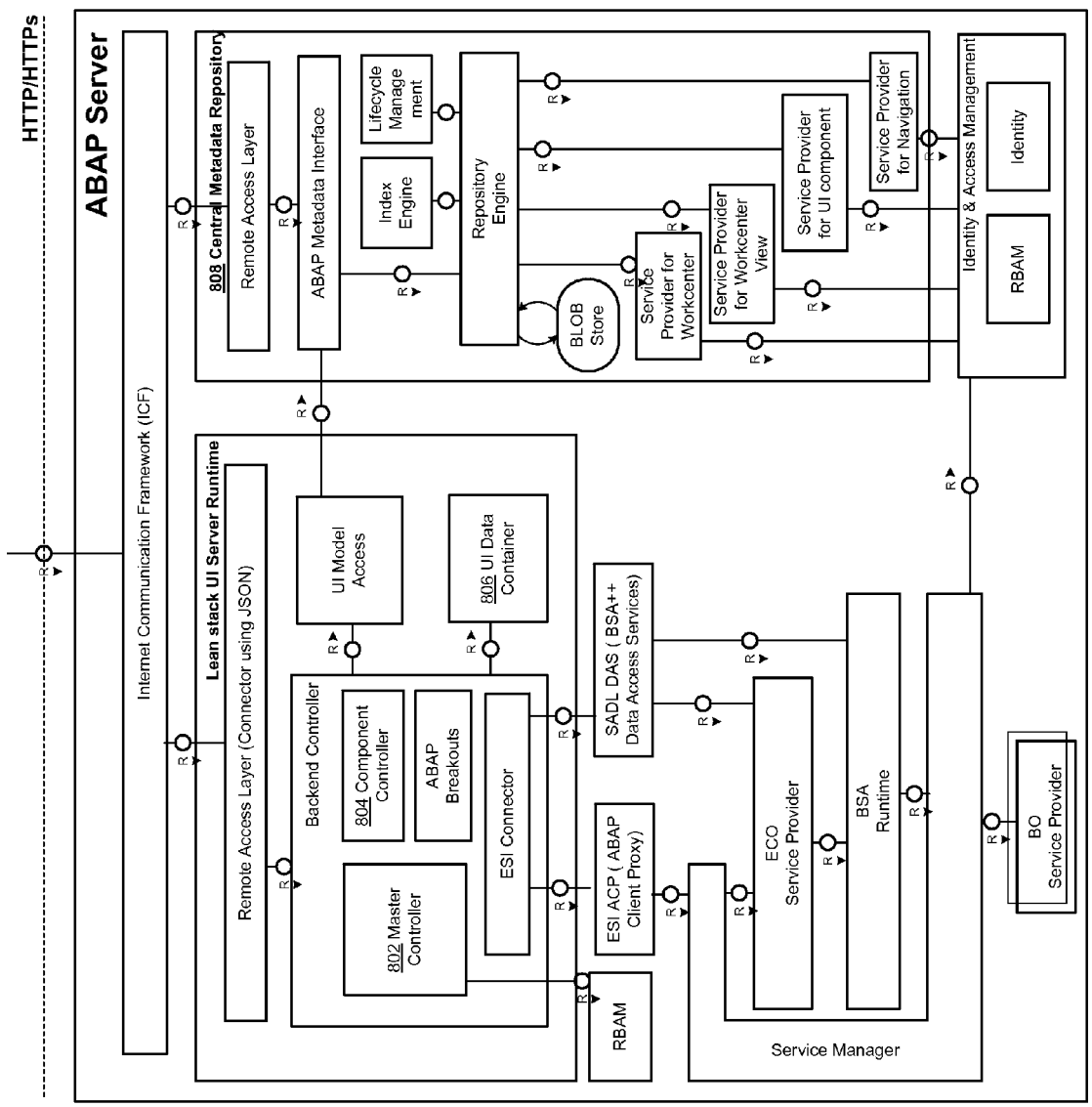
FIG. 8 is a block diagram of an example runtime backend device.

FIG. 8 is a block diagram of an example runtime backend device 800. After the client runtime 700 (as discussed above) triggers the initialization of a UI component in the backend for a first time in a session, the UI server runtime 800 may first create a master controller 802 for the complete session and then may generate a component controller 804 for each component that is requested from the client runtime 700. Each component controller 804 may build a UI data container 806 from the information of the UI model for a component. The master controller 802 may handle the choreography of the different controllers and may build a bracket for all operations targeted for one controller. The master controller 802 may also trigger another runtime and provide the other runtime with all relevant metadata. Relevant information is stored within the models of the UI components.

After the master controller 802 has processed all component controllers 804, it collects all the data that has changed in the UI data container 806 and transports all changed data to the client.

As discussed previously, the UI components may be stored in a central metadata repository 808 on the backend device.

According to an example embodiment, communications between components may be modeled via semantic navigation targets. In this instance, target components are not named directly, but navigation may be invoked based on a host business object and an operation. An operation may be a standard-operation (e.g., display, edit, list, etc.) or a custom operation introduced in a navigation registry. The in- and out-ports of a UI component may be used in the definition of a navigation to identify the involved UI components for the runtime.

A navigation provider may thus replace dynamically at component load/generation time the semantic navigation targets by UI components. This concept allows flexibility regarding determination of navigation targets according to use cases. The semantics of a business object and an operation (e.g., SalesOrder-Open) may be used as a navigation query for requesting a navigation target. Each application UI to be used as a navigation target defines a business object and an operation name as navigation target descriptor to indicate which navigation requests it supports.

To support some special use cases (e.g., globalization, verticalization) a third parameter beside business object and operation may be made available which has no fixed semantic but can be defined by the applications (e.g., in some cases this third parameter is the country for which a special UI component has to be launched). In another exemplary implementation, whenever declaration and registration may not be sufficient, a custom code handler may be used, which gets invoked by the framework at resolution time. The relevant data like the context, parameters and instance data are passed into this implementation and the custom code handler can dynamically determine the target component for navigation based on this data.

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
at least one memory storing instructions; and
at least one processor configured to execute the instructions which, when executed, implement a user interface (UI) designer client, a client engine, a UI runtime server client, a repository and a customized view engine, wherein:
the user interface designer client is arranged and configured to run on a first client device on a client side of a network to enable creation of UI models;
the client engine is arranged and configured to run on a second client device on the client side of the network as a plug in application to a browser application without using a Java stack to initiate requests for one or more of the UI models and to initiate requests for one or more host-based applications, receive the UI models in response to the requests and interpret and render the UI models at runtime;
the UI runtime server client is located on a server on the server side of the network and is arranged and configured to interface with the client engine to receive and process the requests for the UI models from the client engine and to receive and process the requests for the host-based applications including a common output for the host-based applications; and
the repository is located on the server on the server side of the network and is arranged and configured to:
interface with the UI designer client and store the UI models as created using the UI designer client and to store the host-based applications, and
interface with the UI runtime server client to deliver requested UI models to the UI runtime server client for interpretation and rendering by the client engine,
wherein the client engine further comprises the customized view engine that is configured to provide a customized output of the host-based applications to a particular user, wherein the customized output is different from the common output of the host-based applications received from the UI runtime server.

2. The computer system of claim 1 wherein:
the client engine comprises multiple client engines with each of the client engines associated with a different customer;
the UI runtime server client is arranged and configured to interface with each of the client engines to receive and process the requests for the UI models from the client engines; and
the repository is arranged and configured to maintain customer specific content in a layer separate from the UI models and to deliver requested UI models and customer specific content to the UI runtime server client for interpretation and rendering by a specific client engine.

3. The computer system of claim 1 wherein the UI models are configured to be interpreted and rendered by the client engine independent of a technology used by the client engine.

4. The computer system of claim 1 wherein:
the at least one processor executes the instructions which, when executed, implement a client controller, a server controller and a backend synchronization manager;
each of the UI models comprises a data model;
the client engine comprises the client controller; and
the UI runtime server client comprises the server controller and the backend synchronization manager, the backend synchronization manager being arranged and configured to synchronize the client controller and the server controller using the UI data models.

5. The computer system of claim 1 wherein the UI model created using the UI designer client are the same UI models that are interpreted and rendered by the client engine.

6. The computer system of claim 1 wherein the customized output for the particular user includes at least one custom pane.

7. A non-transitory recordable storage medium having recorded and stored thereon instructions that, when executed, perform the actions of:
running a user interface (UI) designer client on a first client device on a client side of a network, the UI designer client configured to enable creation of UI models;
running a client engine on a second client device on the client side of the network as a plug in application to a browser application without using a Java stack, the client engine configured to initiate requests for one or more of the UI models and to initiate requests for one or more host-based applications, receive the UI models in response to the requests and interpret and render the UI models at runtime;
running a UI runtime server client that is located on a server on a server side of the network, the UI runtime server client being configured to interface with the client engine to receive and process the requests for the UI models from the client engine and to receive and process the requests for the host-based applications including a common output for the host-based applications; and
managing a repository that is located on the server on the server side of the network, the repository being configured to:
interface with the UI designer client and store the UI models as created using the UI designer client and to store the host-based applications, and
interface with the UI runtime server client to deliver requested UI models to the UI runtime server client for interpretation and rendering by the client engine,
wherein the client engine further comprises a customized view engine that is configured to provide a customized output of the host-based applications to a particular user, wherein the customized output is different from the common output of the host-based applications received from the UI runtime server.

8. The non-transitory recordable storage medium of claim 7 wherein:
the client engine comprises multiple client engines with each of the client engines associated with a different customer;
the UI runtime server client is arranged and configured to interface with each of the client engines to receive and process the requests for the UI models from the client engines; and
the repository is arranged and configured to maintain customer specific content in a layer separate from the UI models and to deliver requested UI models and customer specific content to the UI runtime server client for interpretation and rendering by a specific client engine.

9. The non-transitory recordable storage medium of claim 7 wherein the UI models are configured to be interpreted and rendered by the client engine independent of a technology used by the client engine.

10. The non-transitory recordable storage medium of claim 7 wherein:
each of the UI models comprises a data model;
the client engine comprises a client controller; and
the UI runtime server client comprises a server controller and a backend synchronization manager, the backend synchronization manager being arranged and configured to synchronize the client controller and the server controller using the UI data models.

11. The non-transitory recordable storage medium of claim 7 wherein the UI model created using the UI designer client are the same UI models that are interpreted and rendered by the client engine.

12. The non-transitory recordable storage medium of claim 7 wherein the customized output for the particular user includes at least one custom pane.

13. A computer system comprising:
at least one memory storing instructions; and
at least one processor configured to execute the instructions which, when executed, implement multiple client engine, a user interface (UI) runtime server client, a repository and a customized view engine, wherein:
each of the multiple client engines is associated with a different customer and each of the client engines is arranged and configured to run on a client device on the client side of the network as a plug in application to a browser application without using a Java stack and to initiate requests for one or more UI models and to initiate requests for one or more host-based applications, receive the UI models in response to the requests and interpret and render the UI models at runtime;
the UI runtime server client is located on a server on the server side of the network and is arranged and configured to interface with each of the client engines to receive and process the requests for the UI models from the client engines and to receive and process the requests for the host-based applications including a common output for the host-based applications; and
the repository is located on the server on the server side of the network and is arranged and configured to:
store the UI models and to store the host-based applications, and
interface with the UI runtime server client to deliver requested UI models to the UI runtime server client for interpretation and rendering by a requesting client engine,
wherein each of the client engines further comprises the customized view engine that is configured to provide a customized output of the host-based applications to a particular user, wherein the customized output is different from the common output of the host-based applications received from the UI runtime server.

14. The computer system of claim 13 wherein the repository is arranged and configured to:
maintain customer specific content in a layer separate from the UI models; and
interface with the UI runtime server client to deliver requested UI models and customer specific content to the UI runtime server client for interpretation and rendering by the requesting client engine.

15. The computer system of claim 13 wherein:
the at least one processor executes the instructions which, when executed, implement a client controller, a server controller and a backend synchronization manager;
each of the UI models comprises a data model;
the client engine comprises the client controller; and
the UI runtime server client comprises the server controller and the backend synchronization manager, the backend synchronization manager being arranged and configured to synchronize the client controller and the server controller using the UI data models.

16. The computer system of claim 13 wherein the UI runtime server client is configured to interpret and render the UI models.

17. The computer system of claim 13 wherein the customized output for the particular user includes at least one custom pane.

* * * * *